(12) United States Patent
Bulan et al.

(10) Patent No.: US 12,056,815 B2
(45) Date of Patent: Aug. 6, 2024

(54) GENERATING MAP FEATURES BASED ON AERIAL DATA AND TELEMETRY DATA

(71) Applicant: GM GLOBAL TECHNOLOGY OPERATIONS LLC, Detroit, MI (US)

(72) Inventors: Orhan Bulan, Troy, MI (US); Yehenew G. Mengistu, Sterling Heights, MI (US); Sheetal Mahesh, Pflugerville, TX (US); Michael A. Losh, Rochester Hills, MI (US); David H. Clifford, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1141 days.

(21) Appl. No.: 16/441,866

(22) Filed: Jun. 14, 2019

(65) Prior Publication Data
US 2020/0394838 A1 Dec. 17, 2020

(51) Int. Cl.
*G06T 17/05* (2011.01)
*G06F 16/29* (2019.01)
*G06V 10/80* (2022.01)
*G06V 20/10* (2022.01)
*G06V 20/56* (2022.01)

(52) U.S. Cl.
CPC .............. *G06T 17/05* (2013.01); *G06F 16/29* (2019.01); *G06V 10/80* (2022.01); *G06V 20/182* (2022.01); *G06V 20/588* (2022.01); *G06T 2207/10032* (2013.01)

(58) Field of Classification Search
CPC ........... G06T 17/05; G06T 2207/10032; G06F 16/29; G06K 9/0063; G06K 9/00798; G06K 9/00651; G06K 9/6288; G06K 9/6289; G01C 21/3841; G01C 21/3852

USPC .......................................................... 701/532
See application file for complete search history.

(56) References Cited

U.S. PATENT DOCUMENTS

| | | | |
|---|---|---|---|
| 10,605,606 B2 * | 3/2020 | Ma | G06K 9/342 |
| 2010/0266161 A1 | 10/2010 | Kmiecik et al. | |
| 2014/0146173 A1 | 5/2014 | Joyce et al. | |
| 2017/0328716 A1 | 11/2017 | Ma | |
| 2018/0237000 A1 | 8/2018 | Litkouhi et al. | |
| 2019/0130182 A1 * | 5/2019 | Zang | G06V 20/182 |

FOREIGN PATENT DOCUMENTS

| | | | |
|---|---|---|---|
| CN | 104572065 A | | 4/2015 |
| CN | 108509826 A | | 9/2018 |
| JP | 2009069903 A | * | 4/2009 |

OTHER PUBLICATIONS

Chinese Office Action for Chinese Application No. 202010533658.4; Report Mail Date May 23, 2023 (With Machine Translation; pp. 1-14).

* cited by examiner

*Primary Examiner* — Maceeh Anwari
(74) *Attorney, Agent, or Firm* — CANTOR COLBURN LLP

(57) ABSTRACT

In one example implementation according to aspects of the present disclosure, a computer-implemented method for generating map features includes receiving, by a processing device, aerial image data. The method further includes receiving, by the processing device, telemetry data. The method further includes performing, by the processing device, data fusion on the aerial image data and the telemetry data to generate map features. The method further includes controlling, by the processing system, a vehicle based at least in part on the map features.

12 Claims, 11 Drawing Sheets

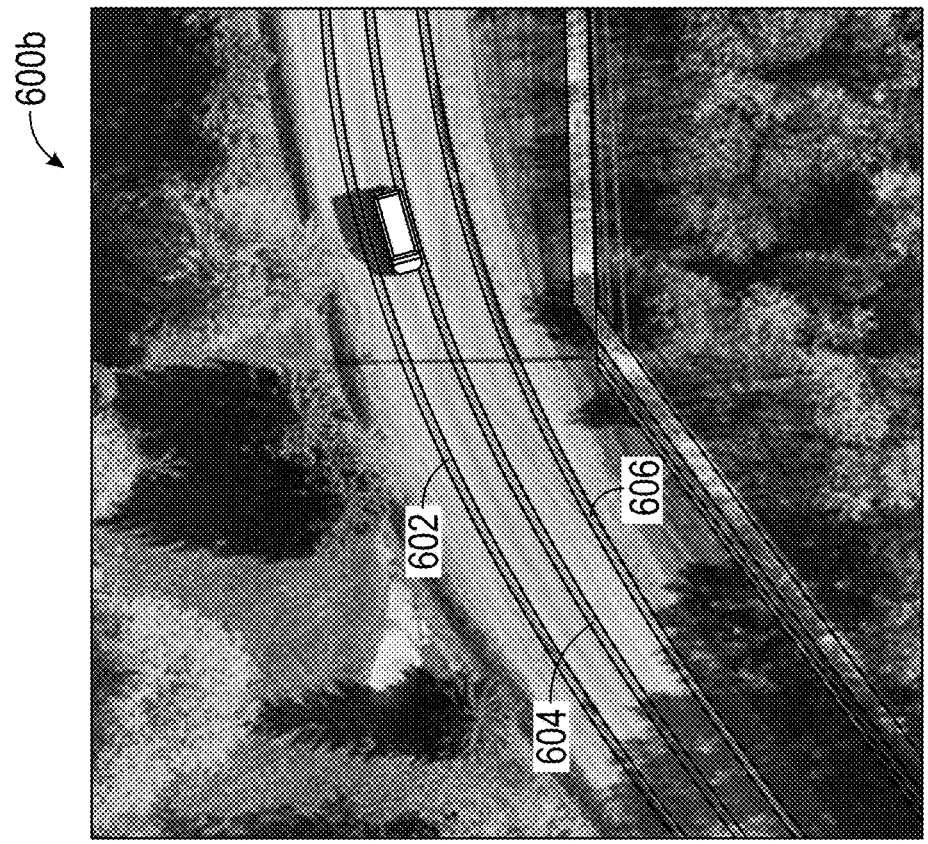
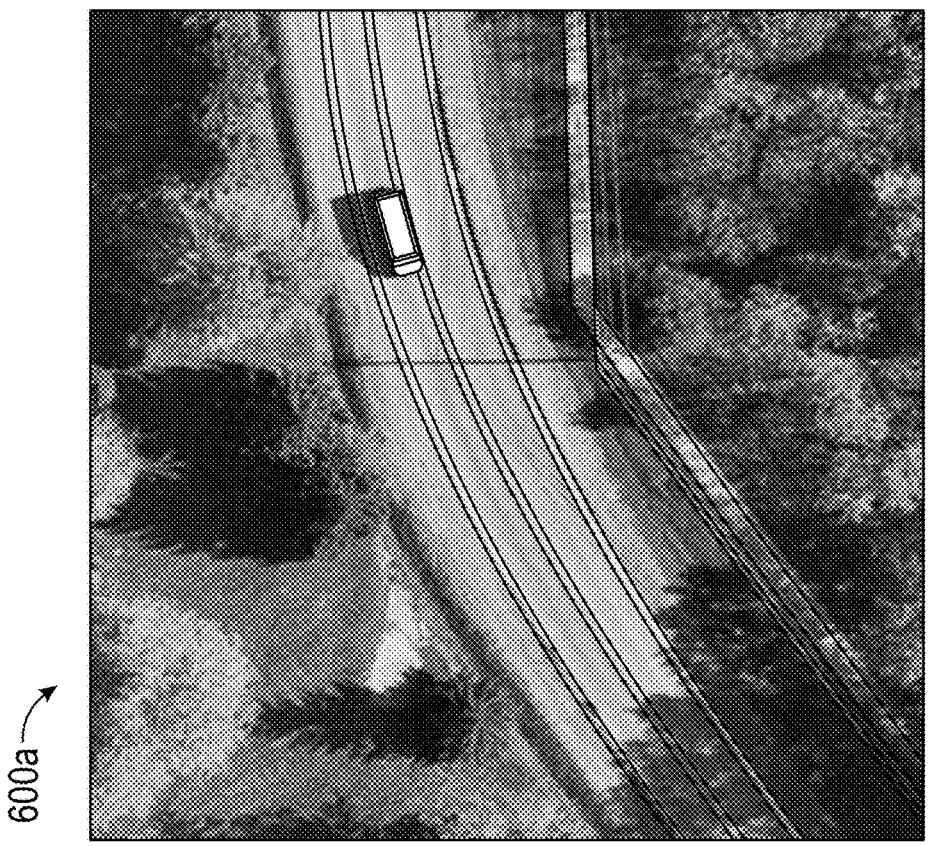
FIG. 6

| | A | B | C | D | E | F | G | H | I |
|---|---|---|---|---|---|---|---|---|---|
| 1 | lat | lon | Curvature | Heading | Lanewidth | SegmentID | xSectionID | PointID | LaneMarkType |
| 2 | 42.61037 | -83.0317 | 1.25E-10 | 177.915175 | 3.713591396 | 4 | 9 | 1 | 1 |
| 3 | 42.61035 | -83.0317 | 5.99E-10 | 178.0219856 | 3.613878982 | 4 | 10 | 1 | 1 |
| 4 | 42.61033 | -83.0317 | 5.71E-10 | 176.4540208 | 3.520891418 | 4 | 11 | 1 | 1 |
| 5 | 42.61031 | -83.0317 | 2.93E-10 | 176.4540223 | 3.444277115 | 4 | 12 | 1 | 1 |
| 6 | 42.61029 | -83.0317 | 8.36E-11 | 176.4540238 | 3.37926965 | 4 | 13 | 1 | 1 |
| 7 | 42.61028 | -83.0317 | 1.67E-10 | 176.8931409 | 3.329994138 | 4 | 14 | 1 | 1 |
| 8 | 42.61026 | -83.0317 | 9.76E-11 | 176.4540269 | 3.284073338 | 4 | 15 | 1 | 1 |
| 9 | 42.61037 | -83.0316 | 0.002827644 | -179.0959489 | 2.953953273 | 4 | 9 | 2 | 3 |
| 10 | 42.61035 | -83.0316 | 0.002828653 | -179.4909437 | 3.037407766 | 4 | 10 | 2 | 3 |
| 11 | 42.61033 | -83.0316 | 0.002828456 | -179.7242663 | 3.109069045 | 4 | 11 | 2 | 3 |
| 12 | 42.61031 | -83.0316 | 0.002828907 | 179.6267427 | 3.168987876 | 4 | 12 | 2 | 3 |
| 13 | 42.6103 | -83.0316 | 0.002828151 | 179.2544272 | 3.217103572 | 4 | 13 | 2 | 3 |
| 14 | 42.61028 | -83.0316 | 0.002828508 | 178.9866755 | 3.253560587 | 4 | 14 | 2 | 3 |
| 15 | 42.61026 | -83.0316 | 0.002826731 | 178.6603943 | 3.278235656 | 4 | 15 | 2 | 3 |
| 16 | 42.61037 | -83.0316 | 2.79E-08 | 176.9268756 | 3.436637225 | 4 | 9 | 3 | 5 |
| 17 | 42.61035 | -83.0316 | 2.74E-08 | 178.2705395 | 3.440018263 | 4 | 10 | 3 | 5 |
| 18 | 42.61033 | -83.0316 | 2.76E-08 | 176.9268847 | 3.436636402 | 4 | 11 | 3 | 5 |
| 19 | 42.61031 | -83.0316 | 2.77E-08 | 176.9268893 | 3.43663616 | 4 | 12 | 3 | 5 |
| 20 | 42.6103 | -83.0316 | 2.73E-08 | 178.2659033 | 3.440009077 | 4 | 13 | 3 | 5 |
| 21 | 42.61028 | -83.0316 | 2.76E-08 | 176.9268985 | 3.436636017 | 4 | 14 | 3 | 5 |
| 22 | 42.61026 | -83.0316 | 2.74E-08 | 178.270559 | 3.440017581 | 4 | 15 | 3 | 5 |
| 23 | 42.61037 | -83.0316 | 5.16E-10 | 176.9269164 | 3.669465839 | 4 | 9 | 4 | 4 |

FIG. 8

GENERATING MAP FEATURES BASED ON AERIAL DATA AND TELEMETRY DATA

INTRODUCTION

The present disclosure relates generally to data processing systems and more particularly to generating map features based on aerial data and telemetry data.

High definition maps enable autonomous vehicles (e.g., an autonomous car, an autonomous motorcycle, an autonomous boat, or any other type of automobile or autonomous automobile) to navigate by providing precise localization and pose estimation. High definition maps are often obtained using driving mapping vehicles equipped with sensors (e.g., cameras, RADAR, LiDAR, etc.). High definition maps include road features, such as lane markings, lane widths, curvature information, etc.), that enable autonomous navigation. The road features are extracted from the data collected by the sensors of the driving mapping vehicles.

SUMMARY

In one exemplary embodiment, a computer-implemented method for generating map features includes receiving, by a processing device, aerial image data. The method further includes receiving, by the processing device, telemetry data. The method further includes performing, by the processing device, data fusion on the aerial image data and the telemetry data to generate map features. The method further includes controlling, by the processing system, a vehicle based at least in part on the map features.

In some examples, performing the data fusion further includes receiving geolocations of a start of a road and an end of the road. In some examples, performing the data fusion further includes extracting nodes, from a navigation map, along the road between the start of the road and the end of the road. In some examples, performing the data fusion further includes performing image processing analysis to detect the map features. In some examples, performing the data fusion further includes converting the map features to a coordinate format. In some examples, performing the data fusion further includes performing post-processing on the map features to refine the map features. In some examples, the map features include at least one of a lane width, a curvature, a heading, a lane marking, a lane width, a road edge, a stop bar, or a pedestrian cross-walk. In some examples, the method includes updating a map having the map features based at least in part on ground survey data.

In another exemplary embodiment, a system in a vehicle, the system having a memory including computer readable instructions and a processing device for executing the computer readable instructions for performing a method for generating map features. In examples, the method includes receiving, by a processing device, aerial image data. The method further includes receiving, by the processing device, telemetry data. The method further includes performing, by the processing device, data fusion on the aerial image data and the telemetry data to generate map features. The method further includes controlling, by the processing system, the vehicle based at least in part on the map features.

In some examples, performing the data fusion further includes receiving geolocations of a start of a road and an end of the road. In some examples, performing the data fusion further includes extracting nodes, from a navigation map, along the road between the start of the road and the end of the road. In some examples, performing the data fusion further includes performing image processing analysis to detect the map features. In some examples, performing the data fusion further includes converting the map features to a coordinate format. In some examples, performing the data fusion further includes performing post-processing on the map features to refine the map features. In some examples, the map features include at least one of a lane width, a curvature, a heading, a lane marking, a lane width, a road edge, a stop bar, or a pedestrian cross-walk. In some examples, the method includes updating a map having the map features based at least in part on ground survey data.

In yet another exemplary embodiment a computer program product includes a computer readable storage medium having program instructions embodied therewith, wherein the computer readable storage medium is not a transitory signal per se, the program instructions executable by a processing device to cause the processing device to perform a method for generating map features. In examples, the method includes receiving, by a processing device, aerial image data. The method further includes receiving, by the processing device, telemetry data. The method further includes performing, by the processing device, data fusion on the aerial image data and the telemetry data to generate map features. The method further includes controlling, by the processing system, a vehicle based at least in part on the map features.

In some examples, performing the data fusion further includes receiving geolocations of a start of a road and an end of the road. In some examples, performing the data fusion further includes extracting nodes, from a navigation map, along the road between the start of the road and the end of the road. In some examples, performing the data fusion further includes performing image processing analysis to detect the map features.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIG. 6 depicts an aerial image before and after image processing analysis is performed according to one or more examples described herein;

FIG. 8 depicts an example chart of the map data that is exported in FIG. 7 according to one or more examples described herein;

DETAILED DESCRIPTION

Figure 1:
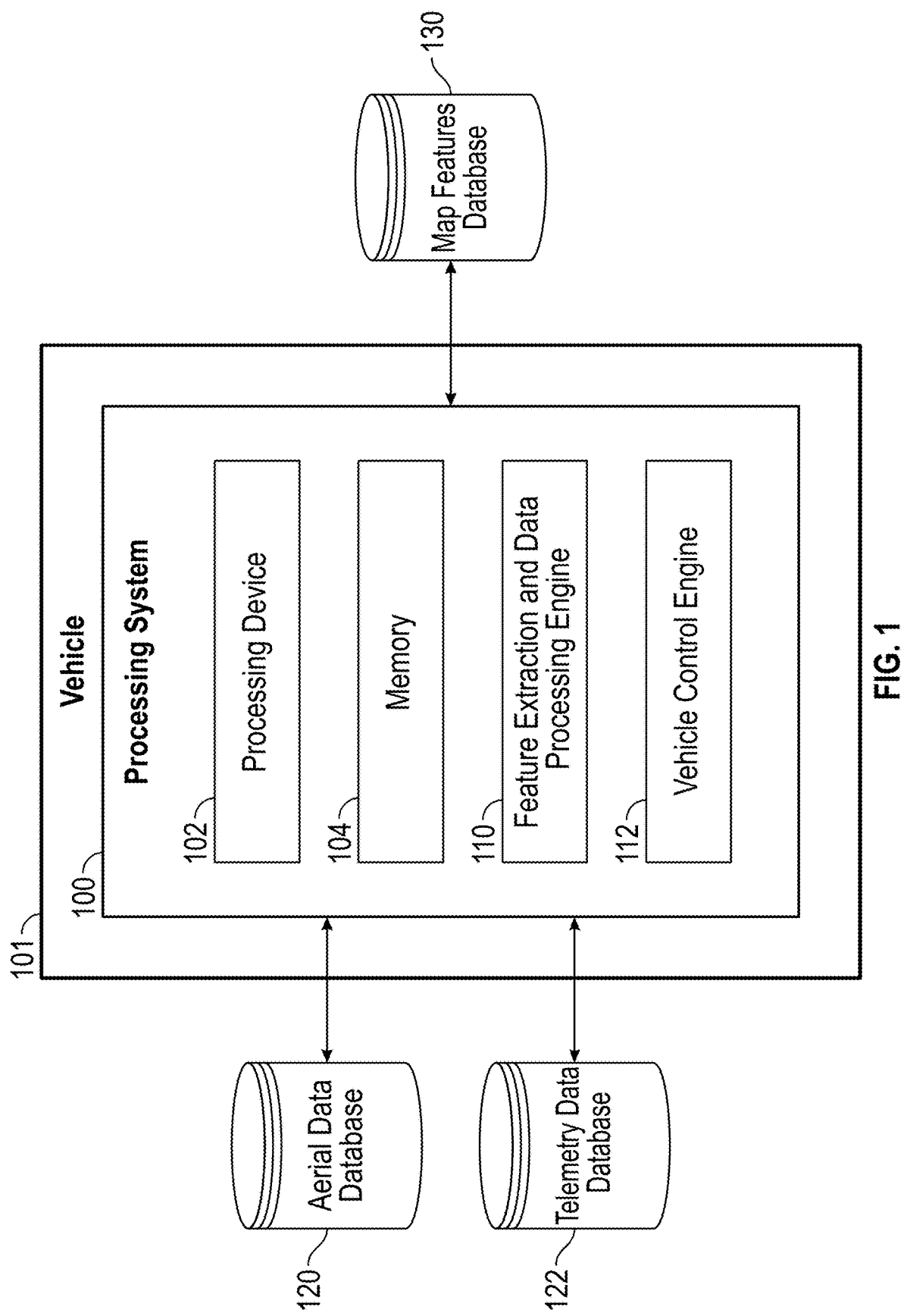
FIG. 1 depicts a block diagram of a processing system for generating map features based on aerial data and telemetry data according to one or more examples described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

High definition maps enable autonomous vehicles (e.g., an autonomous car, an autonomous motorcycle, an autonomous boat, or any other type of automobile or autonomous automobile) to navigate by providing precise localization and pose estimation. High definition maps are often obtained using driving mapping vehicles equipped with sensors (e.g., cameras, RADAR, LiDAR, etc.). However, this approach is time consuming, costly, and require specialized driving mapping vehicles to collect the data used to create the maps. Moreover, the data can be limited, for example, to public roads while private roads may not be passable to driving mapping vehicles.

The present techniques provide for generating map features based on aerial data and telemetry data without the need for specialized driving mapping vehicles typically used to generate map features. That is, the present techniques generate medium definition maps having the same features as high definition maps and in the same format that autonomous vehicles can utilize. This provides a cost-effective solution for creating high definition map features for autonomous vehicles. The present techniques are also scalable and reduce lead-time for creating maps for new areas because it does not require a mapping vehicle to drive new areas. Further, the present techniques provide simplified maintenance and map updates because maps can be updated as more recent aerial or vehicle telemetry data is acquired.

The present techniques provide a new methodology for creating HD-like map features using standard definition (navigation) maps, aerial imagery, street-view imagery, and/or telemetry data. Examples of map features include lane width, curvature, heading, lane marking/types, lane width, road edges, stop bars, pedestrian cross-walk, etc. The use of telemetry data fills in road regions occluded in the aerial imagery.

FIG. 1 depicts a block diagram of a processing system 100 for generating map features based on aerial data and telemetry data according to one or more examples described herein. In examples, the processing system 100 can be disposed in or associated with a vehicle 101. The processing system 100 includes a processing device 102, a memory 104, a feature extraction and data processing engine 110, and a vehicle control engine 112. The processing system 100 includes and/or is communicatively coupled to an aerial database 120, a telemetry data database 122, and a map features database 130. In other examples, the processing system 100 can include and/or be communicatively coupled to other databases, such as a navigation map database, a street view imagery database, and the like.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these.

In examples, the module(s), component(s), controller(s), engine(s), etc. described herein can be a combination of hardware and programming. The programming can be processor executable instructions stored on a tangible memory, and the hardware can include a processing device 102 (e.g., the processor 1021 of FIG. 10) for executing those instructions. Thus a system memory 104 (e.g., random access memory 1024 of FIG. 10) can store program instructions that when executed by the processing device 102 implement the engines described herein. Other engines, components, modules, controllers, etc. can also be utilized to include other features and functionality described in other examples herein.

Figure 2:
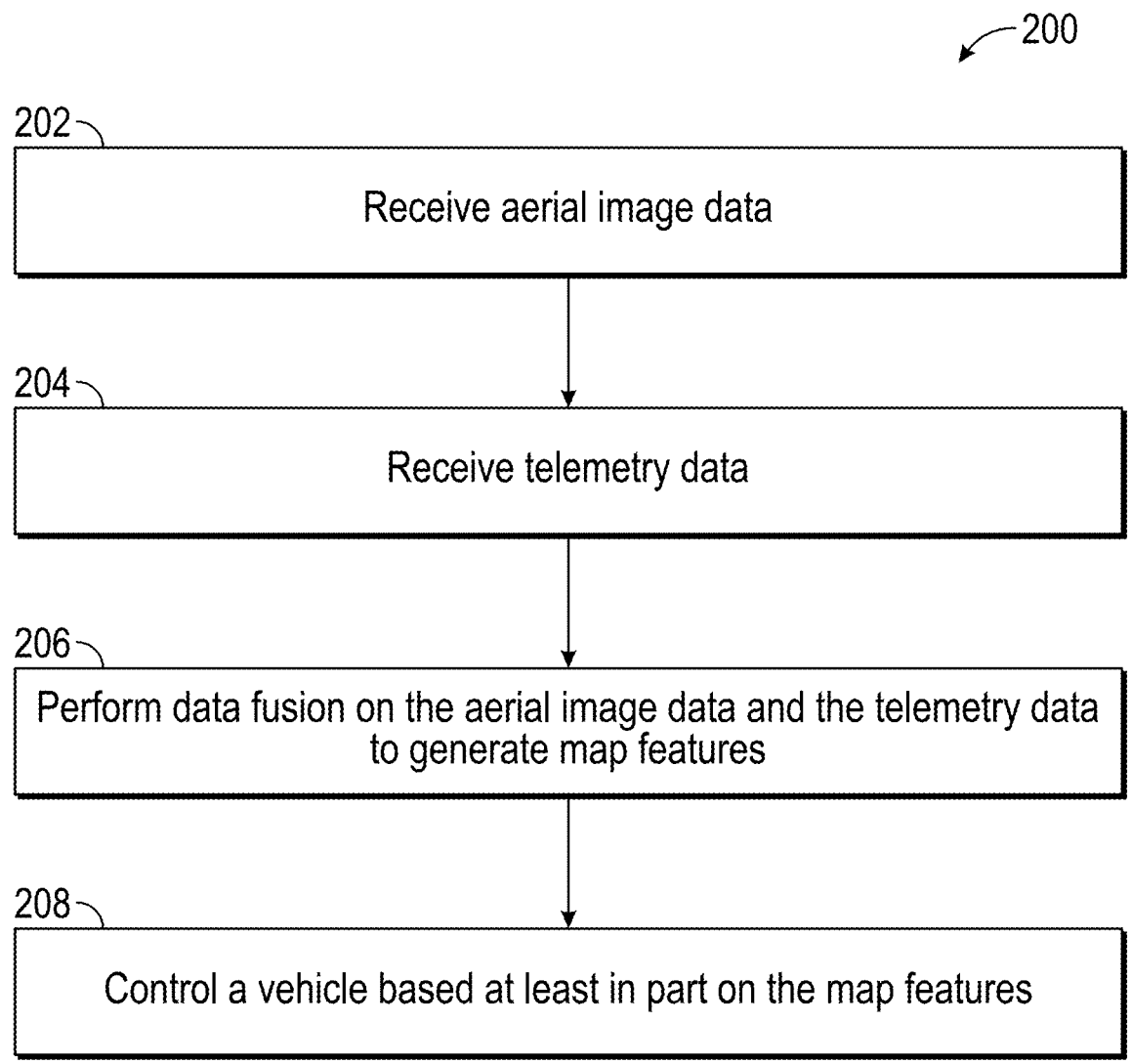
FIG. 2 depicts a flow diagram of a method for generating map features based on aerial data and telemetry data according to one or more examples described herein.

The features and functionality of the components depicted in FIG. 1 are now described with reference to the method depicted in FIG. 2. In particular, FIG. 2 depicts a flow diagram of a method 200 for generating map features based on aerial data and telemetry data according to one or more examples described herein. The method 200 can be implemented, for example, by the processing system 100 of FIG. 1, the processing system 1000 of FIG. 10, or by another suitable processing system or device or combination thereof.

At block 202, the feature extraction and data processing engine 110 receives aerial image data, such as from the aerial data database 120. The aerial data can be collected in the form of images taken by cameras from an aerial viewpoint (e.g., a helicopter, an airplane, a balloon, a satellite, etc.).

At block 204, the feature extraction and data processing engine 110 receives telemetry data, such as from the telemetry data database 122. Telemetry data is received from one or more vehicles over time as the vehicle(s) traverses roads. For example, many vehicles may traverse the same road each day. Anonymous telemetry data can be collected from these vehicles. This telemetry data does not identify the vehicles individually but collectively is useful for detecting map features.

At block 206, the feature extraction and data processing engine 110 performs data fusion on the aerial image data and the telemetry data to generate map features, which are stored in the map features database 130. Data fusion includes analyzing and combining data from the aerial image data and the telemetry data to generate the map features. An example method for generating map features based on aerial data and telemetry is described with respect to FIG. 3.

With continued reference to FIG. 2, at block 208, the control engine 112 controls the vehicle 101 based at least in part on the map features. Controlling the vehicle 101 can include increasing/decreasing speed, changing a direction, and the like. For example, if the map features indicate that the vehicle 101 is veering out of a lane, the vehicle control engine 112 can control the vehicle 101 to maintain the lane. This is possible due to the generated map features that are based on the aerial image data and the telemetry data. Accordingly, vehicle technology is improved by controlling the vehicle using the generated map features.

Additional processes also can be included, and it should be understood that the processes depicted in FIG. 2 represent illustrations and that other processes can be added or existing processes can be removed, modified, or rearranged without departing from the scope and spirit of the present disclosure.

Figure 3:
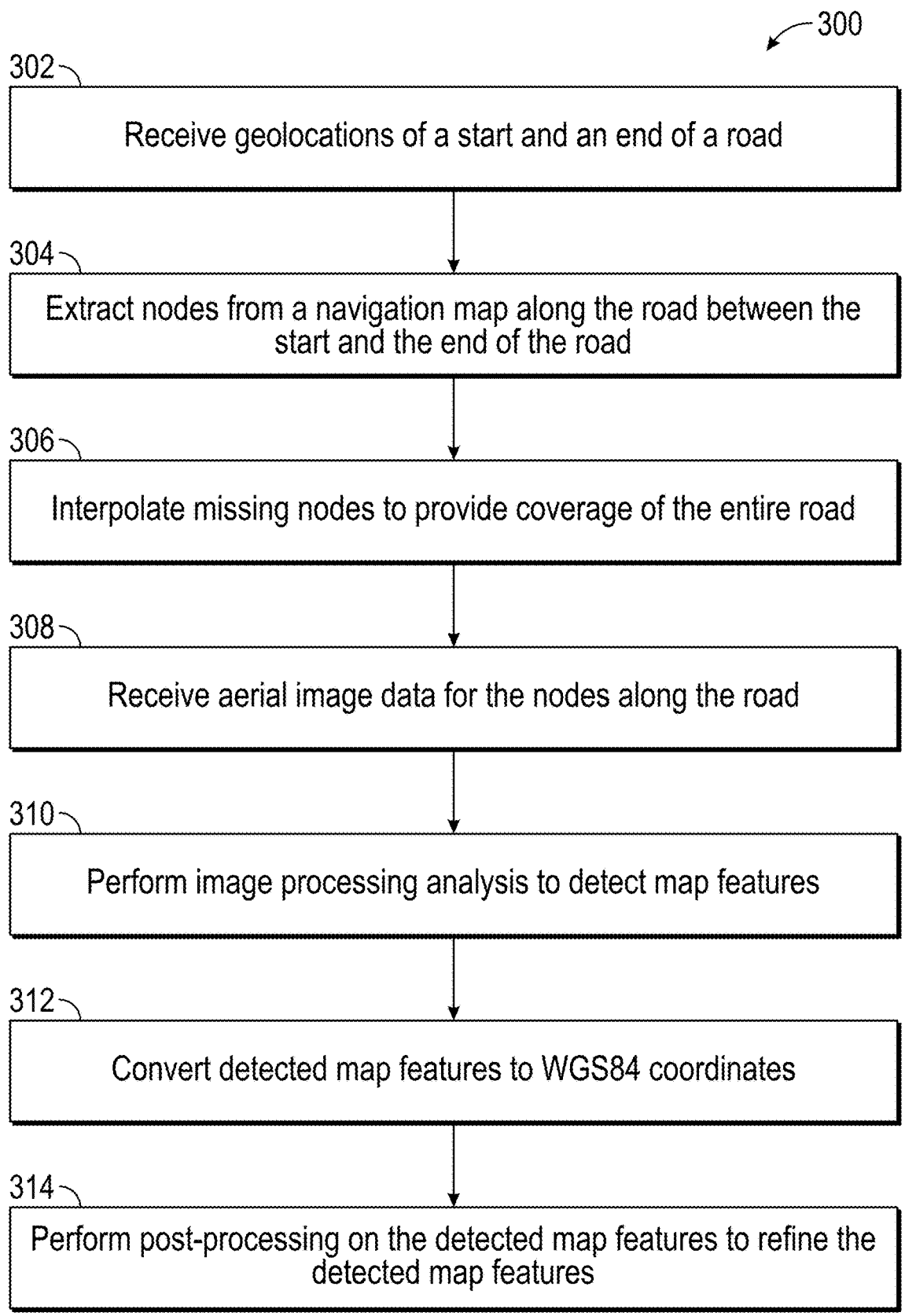
FIG. 3 depicts a flow diagram of a method for generating map features based on aerial data and telemetry data according to one or more examples described herein.

FIG. 3 depicts a flow diagram of a method 300 for generating map features based on aerial data and telemetry data according to one or more examples described herein. In some examples, the method 300 is referred to as "data fusion." The method 300 can be implemented, for example, by the processing system 100 of FIG. 1, the processing system 1000 of FIG. 10, or by another suitable processing system or device or combination thereof.

At block 302, the feature extraction and data processing engine 110 receives geolocations of a start and an end of a road. The geolocations include coordinates designating the start of the road and the end of the road.

Figure 4A:
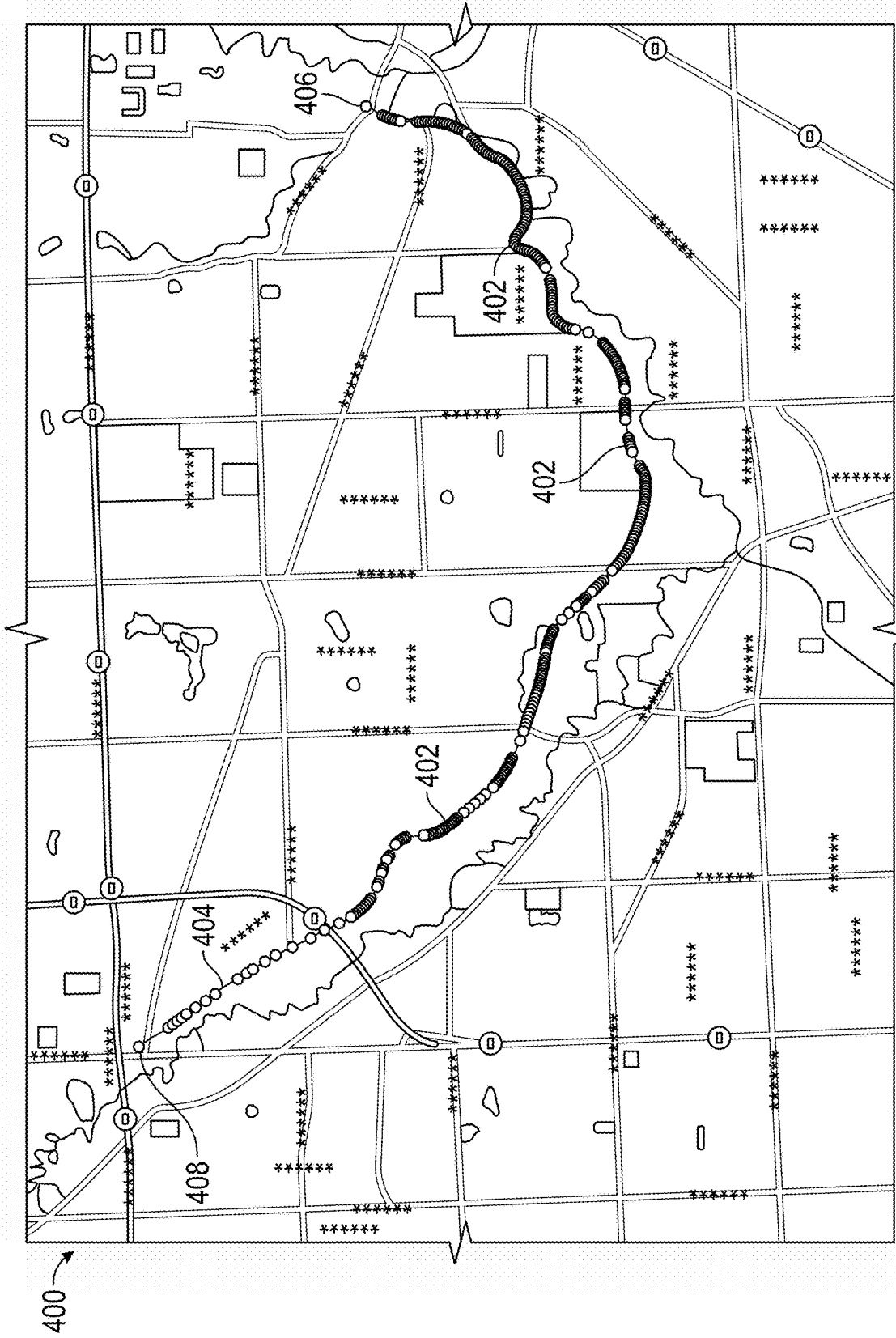
FIGS. 4A and 4B depict a navigation map according to one or more examples described herein.

At block 304, the feature extraction and data processing engine 110 extracts nodes, from a navigation map, along the road between the start and the end of the road. The navigation map can be received from a database storing navigation maps, such as an open street map (OSM) database. FIG. 4A depicts a navigation map 400 having extracted nodes 402 along the road 404 between the start 406 and the end 408 of the road. As shown, the navigation map 400 includes areas with missing nodes along the road 404. These missing nodes can be interpolated at block 306 of FIG. 3.

Figure 4B:
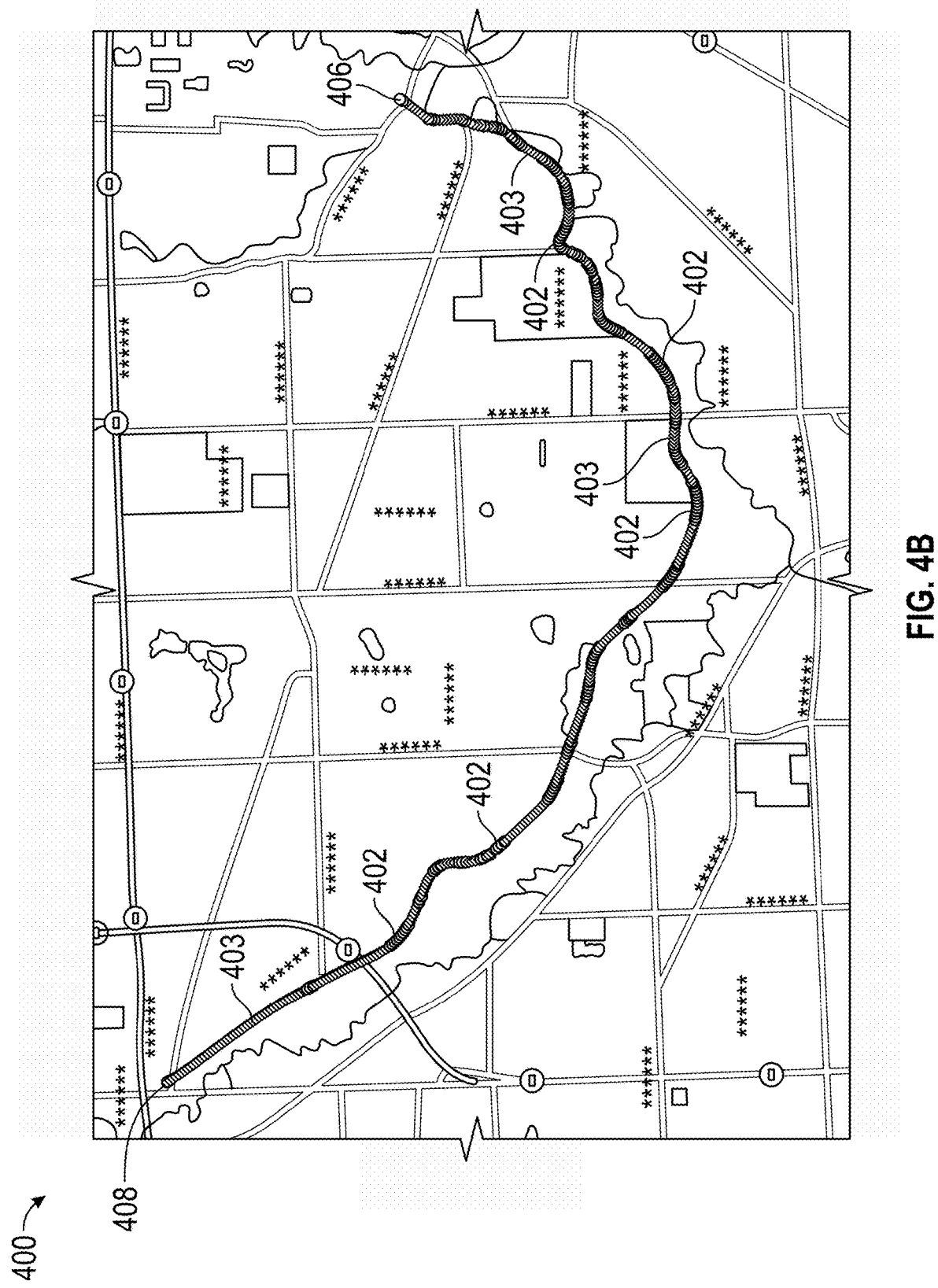

In particular, with continued reference to FIG. 3, at block 306, the feature extraction and data processing engine 110 interpolates missing nodes to provide coverage of the entire road between the start and the end of the road. FIG. 4B depicts the navigation map 400 having the extracted nodes 402 and missing nodes 403 along the road 404 between the start 406 and the end 408 of the road.

Figure 5:
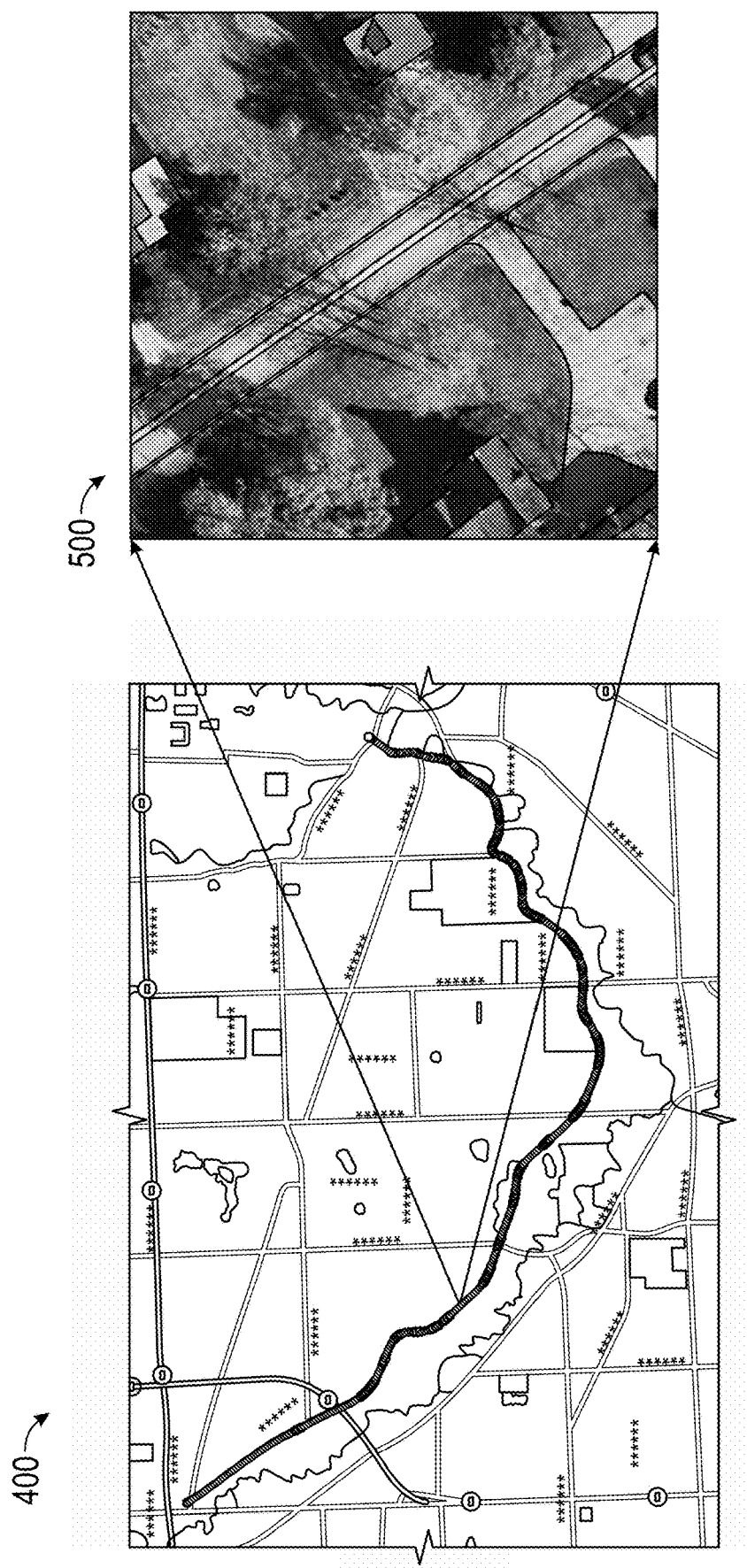
FIG. 5 depicts the navigation map of FIG. 4B having extracted nodes and missing nodes and further depicts aerial image data in the form of an aerial image associated with one of the nodes according to one or more examples described herein.

At block 308, the feature extraction and data processing engine 110 receives aerial image data for each of the nodes associated with the road. For example, aerial image data is received for each of the nodes 402, 403. FIG. 5 depicts the navigation map 400 of FIG. 4B having the extracted nodes 402 and missing nodes 403 and depicts aerial image data in the form of an aerial image 500 associated with one of the nodes 402, 403. The aerial image data, such as the aerial image 500, is captured by cameras or other imaging devices, which may be associated with satellites, helicopters, airplanes, balloons, or other aerial devices. For example, an airplane can use a camera (or multiple cameras) to perform an aerial survey of a geographic area.

With continued reference to FIG. 3, at block 310, the feature extraction and data processing engine 110 performs image processing analysis to detect map features. For example, the feature extraction and data processing engine 110 performs image processing analysis on the aerial image data, such as the aerial image 500 of FIG. 5. An example of the image processing analysis performed by the feature extraction and data processing engine 110 is depicted in FIG. 6. In particular, FIG. 6 depicts an aerial image 600 before (i.e., 600a) and after (i.e., 600b) image processing analysis is performed. More particularly, the feature extraction and data processing engine 110 performs image processing analysis on the aerial image 600a to detect map features 602, 604, 606 superimposed on the aerial image 600b. In this example, the map features 602, 604, 606 represent lane boundaries. More particularly, the map features 602, 606 represents an edge lane boundaries and the map feature 604 represents a center lane boundary. In other examples, map features other than lane markings/boundaries can be detected by the feature extraction and data processing engine 110. Examples of such other map features can include stop bars, turn arrows, pedestrian cross-walks, turn arrows, etc. but are not so limited.

With continued reference to FIG. 3, at block 312, the feature extraction and data processing engine 110 converts the detected map features to a coordinate format. For example, the feature extraction and data processing engine 110 converts the detected map features to WGS84 format coordinates. WGS84 format coordinates are based on the World Geodetic System 1984, which is a standard used in cartography, geodesy, and satellite navigation including GPS. Other coordinate formats can also be used and this disclosure is not so limited.

At block 314, the feature extraction and data processing engine 110 performs post-processing on the detect map features to refine the detected map features.

Missing lane markings/road edges in regions occluded in aerial imagery (such as due to trees, buildings, shadows, etc.) can be post-processed by estimating the road geometry using the telemetry data and other lane markings detected on the road. A line segment missing in an aerial image due to a tree, for example, can be recovered by estimating the road geometry and curvature from telemetry data. Once the road geometry is estimated, the detected lane markings can be extended to recover the lane marking missed under the tree. An example of the post-processing is shown in FIG. 7.

Figure 7:
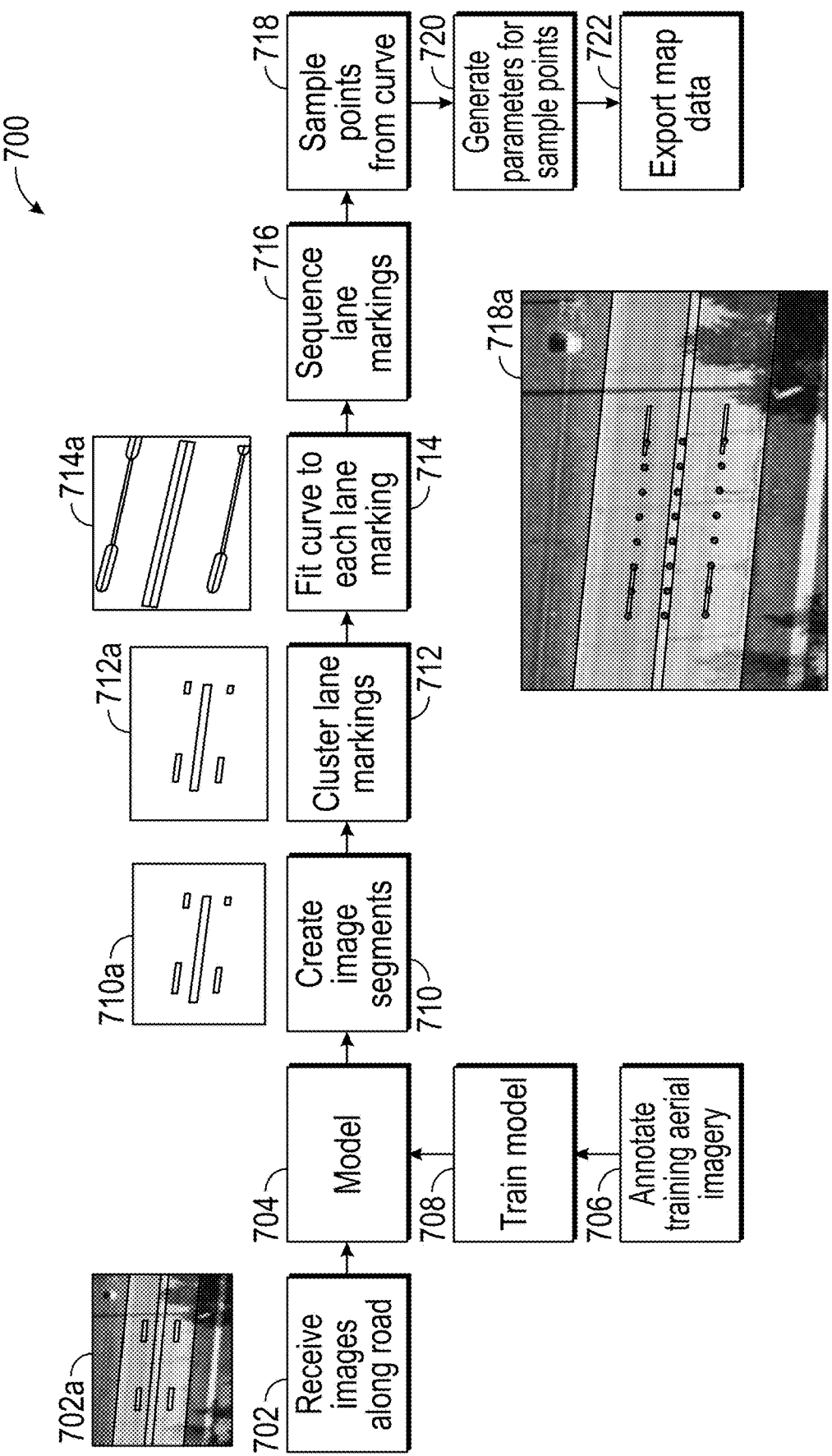
FIG. 7 depicts a flow diagram of a method for post-processing detected map features to refine the detected map features according to one or more examples described herein.

Particularly, FIG. 7 depicts a flow diagram of a method 700 for post-processing detected map features to refine the detected map features according to one or more examples described herein. At block 702, the feature extraction and data processing engine 110 receives images along the road (e.g., the aerial image 500, an aerial image 702a, etc.). Next, a model is applied to the images at block 704.

According to examples described herein, the feature extraction and data processing engine 110 can utilize machine learning functionality to accomplish the various operations of the feature extraction and data processing engine 110 described herein. More specifically, the feature extraction and data processing engine 110 can incorporate and utilize rule-based decision making and AI reasoning to accomplish the various operations of the feature extraction and data processing engine 110 described herein. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used by the feature extraction and data processing engine 110 to identify map features. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

With continued reference to block 704, the feature extraction and data processing engine 110 applies a model to the images at block 704 to create image segments at block 710. The model is trained at block 708 based on annotated training aerial imagery at block 706.

The image segments created at block 710 represent portions or image segments of the images along the road. As an example, the image segments can be 10 meters, 20 meters, 25 meters, 30 meters, etc. An example of an image segment is depicted as image 710a. At block 712, lane markings are clustered, as shown by image 712a. In the example image 712a, three clusters are shown: one cluster represents the one of the dashed lane markings, one cluster represents the other of the dashed lane markings, and one cluster represents the solid lane marking. At block 714, curve fitting techniques are applied to each clustered lane marking from block 712 to fit a curve to each cluster of lane markings using statistical techniques as shown in the example image 714a.

At block 716, lane markings are sequenced or ordered, such as from right to left (i.e., the direction of traffic), although other sequences/orders are possible and within the scope of this disclosure. At block 718, sample points from the curve (from block 714) are determined. The sample points are taken at regular intervals (e.g. 0.5 meters, 1 meter, etc.) along the curve. These are depicted in the image 718a as the "dots" corresponding to the lane markings. As illustrated, the points are evenly spaced (i.e., at regular intervals).

At block 720, parameters are generated for each sample point. Examples of parameters include shape, curve, heading, orientation, direction, coordinates, and the like. Once the parameters are generated, map data from the post-processing technique of the method 700 are output or exported as map data at block 722.

FIG. 8 depicts an example chart 800 of the map data that is exported at block 722 of FIG. 7. In this example, at every 1 meter, a point is located on a lane marking. The heading (latitude and longitude), curvature, segment ID, lane marking type, xSection ID, lane width, and lane marking order for each point is also determined using the post-processing technique of the method 700.

Figure 9:
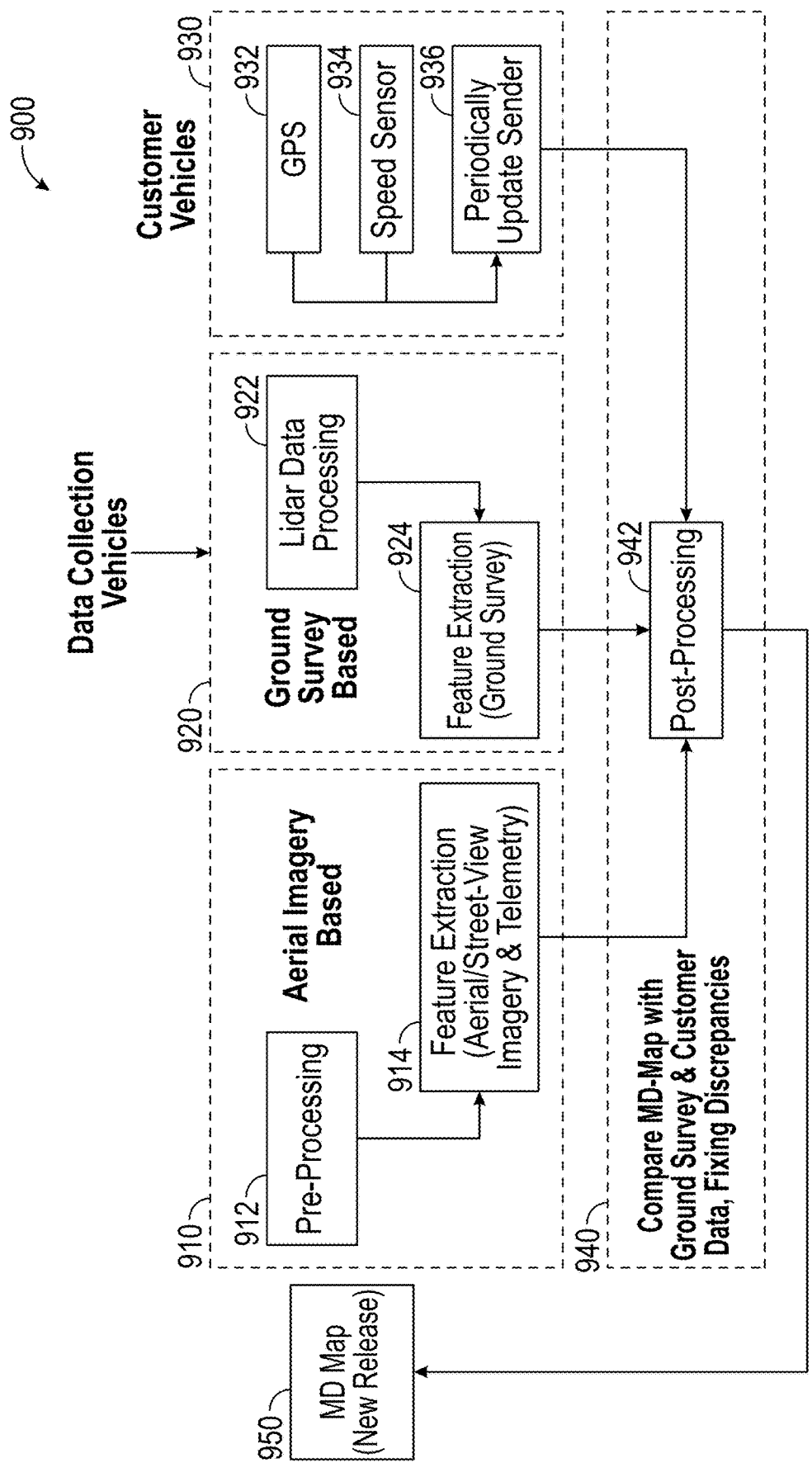
FIG. 9 depicts a flow diagram of a method for correcting map feature discrepancies for medium definition maps according to or more examples described herein.

FIG. 9 depicts a flow diagram of a method 900 for correcting map feature discrepancies for medium definition maps according to or more examples described herein. In this example, data collection vehicles can be used to estimate medium definition map discrepancies and correct them for continuous improvement before production.

At block 910, aerial imagery based map feature detection occurs via pre-processing (912) and feature extraction (914). At block 920, data collection vehicles perform a ground survey by processing LiDAR (or radar) data (922) and perform feature extraction (924). At block 930, vehicles collect telemetry data using a GPS (932) and a speed sensor (934) and periodically provide updates of the telemetry data (936). Results of the feature extraction at blocks 914 and 924 as well as the updates at block 936 are processed (942) to compare a medium definition map with the ground survey and vehicle data to fix discrepancies (940). This comparison can occur in the vehicle to identify the map discrepancies. Once the discrepancies are corrected, a new release of the medium definition map is issued (950).

Additional processes also can be included, and it should be understood that the processes depicted in FIG. 9 represent illustrations and that other processes can be added or existing processes can be removed, modified, or rearranged without departing from the scope and spirit of the present disclosure.

Figure 10:
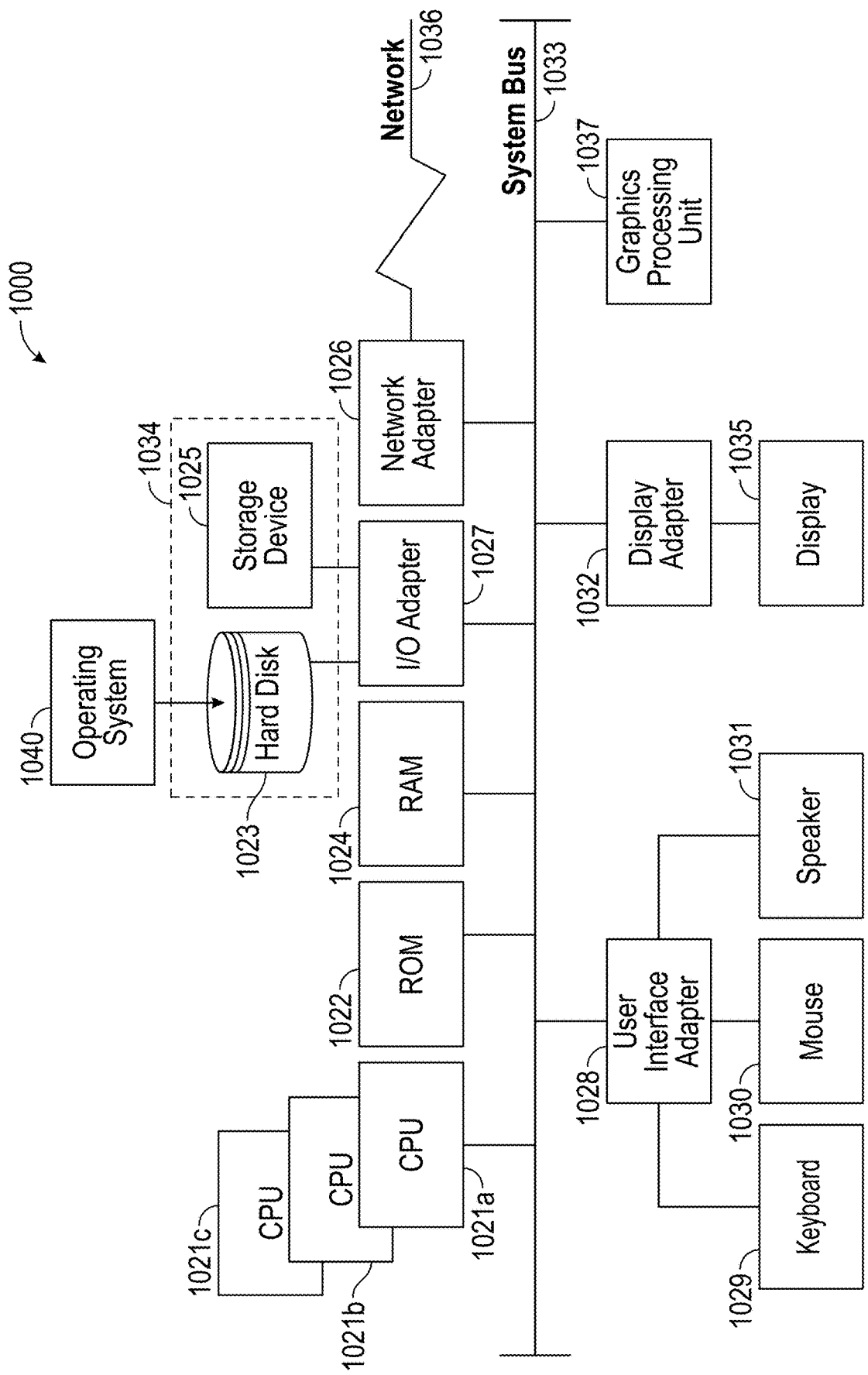
FIG. 10 depicts a block diagram of a processing system for implementing the techniques described herein.

It is understood that the present disclosure is capable of being implemented in conjunction with any other type of computing environment now known or later developed. For example, FIG. 10 depicts a block diagram of a processing system 1000 for implementing the techniques described herein. In examples, processing system 1000 has one or more central processing units (processors) 1021a, 1021b, 1021c, etc. (collectively or generically referred to as processor(s) 1021 and/or as processing device(s)). In aspects of the present disclosure, each processor 1021 can include a reduced instruction set computer (RISC) microprocessor. Processors 1021 are coupled to system memory (e.g., random access memory (RAM) 1024) and various other components via a system bus 1033. Read only memory (ROM) 1022 is coupled to system bus 1033 and may include a basic input/output system (BIOS), which controls certain basic functions of processing system 1000.

Further depicted are an input/output (I/O) adapter 1027 and a network adapter 1026 coupled to system bus 1033. I/O adapter 1027 may be a small computer system interface (SCSI) adapter that communicates with a hard disk 1023 and/or a storage device 1025 or any other similar component. I/O adapter 1027, hard disk 1023, and storage device 1025 are collectively referred to herein as mass storage 1034. Operating system 1040 for execution on processing system 1000 may be stored in mass storage 1034. The network adapter 1026 interconnects system bus 1033 with an outside network 1036 enabling processing system 1000 to communicate with other such systems.

A display (e.g., a display monitor) 1035 is connected to system bus 1033 by display adapter 1032, which may include a graphics adapter to improve the performance of graphics intensive applications and a video controller. In one aspect of the present disclosure, adapters 1026, 1027, and/or 1032 may be connected to one or more I/O busses that are connected to system bus 1033 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1033 via user interface adapter 1028 and display adapter 1032. A keyboard 1029, mouse 1030, and speaker 1031 may be interconnected to system bus 1033 via user interface adapter 1028, which may include, for example, a Super I/O chip integrating multiple device adapters into a single integrated circuit.

In some aspects of the present disclosure, processing system 1000 includes a graphics processing unit 1037. Graphics processing unit 1037 is a specialized electronic circuit designed to manipulate and alter memory to accelerate the creation of images in a frame buffer intended for output to a display. In general, graphics processing unit 1037 is very efficient at manipulating computer graphics and image processing, and has a highly parallel structure that makes it more effective than general-purpose CPUs for algorithms where processing of large blocks of data is done in parallel.

Thus, as configured herein, processing system 1000 includes processing capability in the form of processors 1021, storage capability including system memory (e.g., RAM 1024), and mass storage 1034, input means such as keyboard 1029 and mouse 1030, and output capability including speaker 1031 and display 1035. In some aspects of the present disclosure, a portion of system memory (e.g., RAM 1024) and mass storage 1034 collectively store the operating system 1040 to coordinate the functions of the various components shown in processing system 1000.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes can be made and equivalents can be substituted for elements thereof without departing from its scope. In addition, many modifications can be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for generating map features, the method comprising:
   receiving, by a processing device, aerial image data;
   receiving, by the processing device, telemetry data;
   performing, by the processing device, data fusion on the aerial image data and the telemetry data to generate map features, wherein performing the data fusion further comprises:
     receiving geolocations of the start of the road and the end of the road,
     extracting nodes, from a navigation map, along the road between the start of the road and the end of the road,
     interpolating missing nodes, between the start of the road and the end of the road, to provide coverage for the entire road,
     performing image processing analysis of the ariel image data to detect the map features along the road between the start of the road and the end of the road, and
     converting the map features to a coordinate format, wherein the coordinate format is a WGS84 coordinate format; and
   controlling, by the processing device, a vehicle based at least in part on the map features.

2. The computer-implemented method of claim 1, wherein performing the data fusion further comprises performing post-processing on the map features to refine the map features.

3. The computer-implemented method of claim 1, wherein the map features include at least one of a lane width, a curvature, a heading, a lane marking, a lane width, a road edge, a stop bar, or a pedestrian cross-walk.

4. The computer-implemented method of claim 1, further comprising updating a map having the map features based at least in part on ground survey data.

5. A system in a vehicle comprising:
   a memory comprising computer readable instructions; and
   a processing device for executing the computer readable instructions for performing a method for generating map features, the method comprising:
     receiving, by the processing device, aerial image data;
     receiving, by the processing device, telemetry data;
     performing, by the processing device, data fusion on the aerial image data and the telemetry data to generate map features, wherein the map features include at least one of a lane width, a curvature, a heading, a lane marking, a lane width, a road edge, a stop bar, or a pedestrian cross-walk, wherein performing the data fusion further comprises:
       receiving geolocations of the start of the road and the end of the road,
       extracting nodes, from a navigation map, along the road between the start of the road and the end of the road,
       interpolating missing nodes, between the start of the road and the end of the road, to provide coverage for the entire road, and
       performing image processing analysis of the ariel image data to detect the map features along the road between the start of the road and the end of the road; and
     controlling, by the processing system, the vehicle based at least in part on the map features.

6. The system of claim 5, wherein performing the data fusion further comprises receiving geolocations of a start of a road and an end of the road.

7. The system of claim 6, wherein performing the data fusion further comprises extracting nodes, from a navigation map, along the road between the start of the road and the end of the road.

8. The system of claim 7, wherein performing the data fusion further comprises performing image processing analysis to detect the map features.

9. The system of claim 8, wherein performing the data fusion further comprises converting the map features to a coordinate format.

10. The system of claim 8, wherein performing the data fusion further comprises performing post-processing on the map features to refine the map features.

11. The system of claim 5, wherein the method further comprises updating a map having the map features based at least in part on ground survey data.

12. A computer program product comprising:
    a non-transitory computer readable storage medium having program instructions embodied therewith, the program instructions executable by a processing device to cause the processing device to perform a method for generating map features, the method comprising:
      receiving, by the processing device, aerial image data;
      receiving, by the processing device, telemetry data;
      performing, by the processing device, data fusion on the aerial image data and the telemetry data to generate map features, wherein the map features include at least one of a lane width, a curvature, a heading, a lane marking, a lane width, a road edge, a stop bar, or a pedestrian cross-walk; and controlling, by the processing system, a vehicle based at least in part on the map features, wherein performing the data fusion further comprises:

receiving geolocations of a start of a road and an end of the road;

extracting nodes, from a navigation map, along the road between the start of the road and the end of the road;

interpolating missing nodes, between the start of the road and the end of the road, to provide coverage for the entire road;

performing image processing analysis, on aerial image data for the nodes along the road, to detect the map features along the road between the start to the road and the end of the road;

converting the detected map features to a coordinate format, wherein the coordinate format is a WGS84 coordinate format; and perform post-processing on the detected map features to refine the detected map features.

\* \* \* \* \*